July 2, 1940.　　A. L. MONGER ET AL　　2,206,420
LEVEL AND CLINOMETER
Filed July 13, 1939
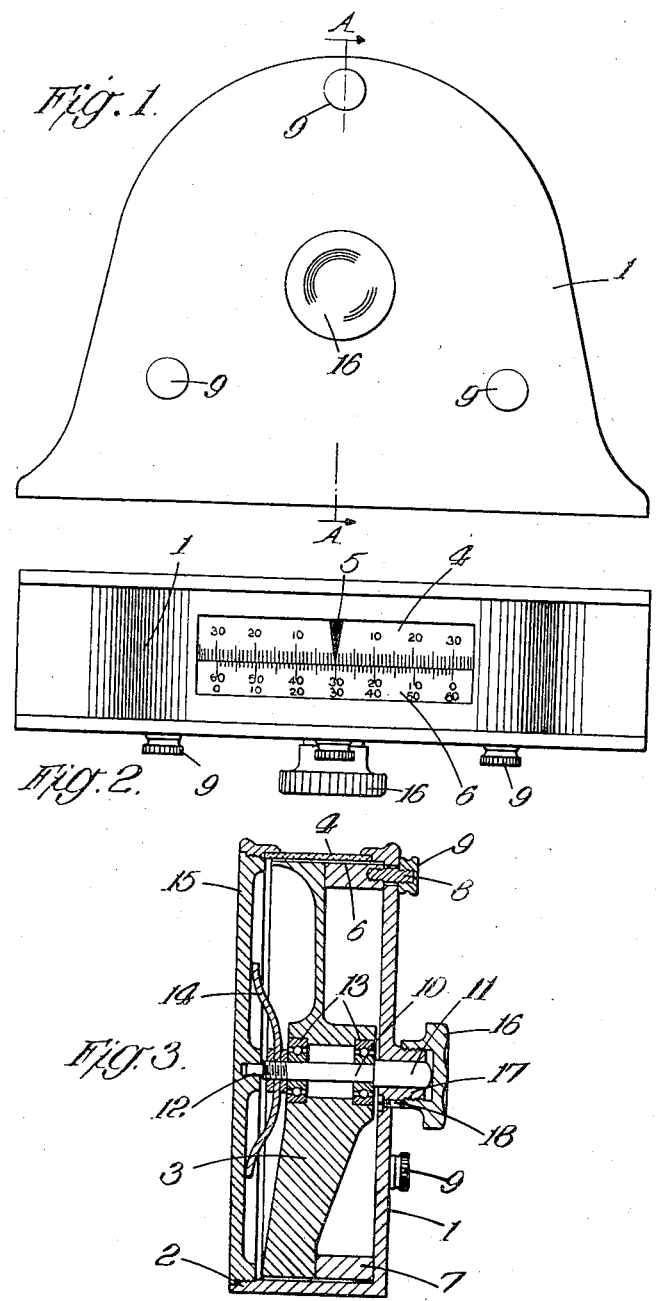
INVENTORS:
ARTHUR LEONARD MONGER
WILLIAM ALEXANDER CUTHBERT
BY: Haseltine, Lake & Co.
ATTORNEYS

Patented July 2, 1940

2,206,420

UNITED STATES PATENT OFFICE 2,206,420

LEVEL AND CLINOMETER

Arthur Leonard Monger, Guildford Park, Guildford, and William Alexander Cuthbert, Compton, Guildford, England, assignors to Monger Clinometer Limited, London, England, a British company Application July 13, 1939, Serial No. 284,184
In Great Britain August 2, 1938

2 Claims. (Cl. 33—215)

This invention relates to levels and clinometers of the kind which include a biased graduated indicating drum freely mounted in bearings in a casing or housing and co-operating with a scale or pointer carried by said casing, said drum giving a visual indication of the angle of inclination of any surface upon which the instrument may be placed in relation to the horizontal or vertical, means being provided for locking the drum and casing together in the relative angular relationship assumed when the instrument is placed on the surface the angle of inclination of which it is desired to ascertain to permit of the instrument being removed therefrom prior to taking the reading. Such instruments may be used as ordinary levels or upon walls or similar surfaces to ascertain whether or not they are truly vertical and have a very large field of use amongst engineers, architects, surveyors and builders where they may take the place of the plumb line and spirit level now commonly employed. A further use of such instruments is in connection with the rigging and maintenance of aircraft or for military or naval use in ascertaining or adjusting the angle of inclination of guns. Such an instrument forms the subject of prior British Patent No. 436,752.

The chief object of the invention is to provide improved means for locking the drum and casing together prior to taking a reading which will not have a disturbing effect upon the drum or the scale indication, a further object being to evolve an instrument of the kind set forth of a generally improved construction and with which more accurate readings can be taken than with such instruments as hitherto constructed.

A level or clinometer of the kind set forth constructed in accordance with the invention includes a biased graduated indicating drum co-operating with a fixed marking or pointer, the drum being movable axially into frictional engagement with a fixed part of the instrument for the purpose of locking the drum and casing of the instrument together against relative angular displacement when desired.

A further feature of the invention is to employ a vernier scale in the form of an annular ring of the same diameter as the drum, which annular ring is engaged by the drum in the locking position, the graduations on the drum and vernier when the parts are in engagement lying in juxtaposition, thus enabling an extremely accurate reading to be taken.

In order that the said invention may be clearly understood and readily carried into effect the same will now be more fully described with reference to the accompanying drawing, wherein:

Figure 1 is a front elevation of a level or clinometer constructed in accordance with the invention.

Figure 2 is a plan view of the same.

Figure 3 is a vertical section on the line A—B of Figure 1.

In the construction illustrated, the instrument comprises a casing or housing 1 of part circular shape having a flat under surface 2, the casing containing a biased graduated indicating drum 3 marked around its periphery in degrees from 0° to 180° in both clockwise and anti-clockwise directions. The upper part of the casing includes a sight window 4 in which is mounted a fixed pointer 5 which co-operates with the graduated drum, the pointer and a portion of the drum being observable through the sight window. When in position upon a truly horizontal surface the zero reading on the drum lies opposite the pointer, the drum, due to the bias weight which in this case is situated at a point diametrically opposite the zero marking, always remaining in a position in which its centre of gravity lies immediately beneath its axis or always returning to that position after oscillating, and thus giving a rough indication of the angle of inclination, if any, of any surface in either direction upon which the instrument may be placed.

In order that a more accurate reading may be obtained, the casing contains a vernier scale 6 marked in minutes, for example from 0 to 60 in both clockwise and anti-clockwise directions the graduations on the vernier lying in juxtaposition to the graduations on the biased drum. The vernier is in the form of an annular ring 7 and preferably of the same diameter as the drum (see Figure 3) and is positioned within the casing by means of threaded studs 8 carrying nuts 9, the studs passing through slots or enlarged holes in the casing, thus permitting of the vernier being initially rotated slightly about the axis of the drum for the purpose of pre-setting the vernier when the instrument is first assembled and tested.

As it is not always feasible to read the graduations when the instrument is in position upon a surface the angle of inclination of which it is desired to ascertain, means are provided for locking the biased indicating drum and casing together against relative angular displacement before removing the instrument from the surface on which it has been placed whereby the instrument can be removed without disturbing the reading and the reading taken in a more convenient position. When in frictional engagement the graduations on the drum and vernier lie in juxtaposition thus enabling an extremely accurate reading to be taken.

In the construction illustrated the biased indicating drum is movable axially for this purpose and is revolubly mounted upon a central spindle 10 located in bearings 11 and 12 formed in the casing, ball or other anti-friction bearings 13 being interposed between the spindle and biased drum. The bearing 12 is of sufficient length to permit of a limited amount of movement of the spindle 10 in an endwise direction against the action of a star or other shaped spring 14 of bowed form which is rigidly secured to the spindle 10 and makes contact at its extremities with the inner wall of the casing, in this case the removable cover plate 15. The spring 14 serves normally to maintain the opposite annular face of the biased drum in frictional engagement with the adjacent face of the annular ring 7, and in this way, when the drum is in the position shown in Figure 3, the drum and casing are locked together against relative angular displacement.

To free the drum prior to taking a reading, a releasing nut 16 is provided in screw threaded engagement with an externally screw threaded boss 17 on the casing, the inner face of the nut bearing on the adjacent extremity of the spindle 11. By turning the releasing nut 16 in the appropriate direction, the spindle 11 and its associated drum 3 are moved in an axial direction against the action of the spring 14, the drum being thus moved out of frictional engagement with the annular ring. A stop, in this case in the form of a screw 18, is provided for limiting rotational movement of the nut 16, the extremity of the screw entering a slot or cut-away part of the nut. When taking a reading, the instrument is placed with its flat under surface resting on the surface, the angle of inclination of which it is desired to ascertain, and the releasing nut operated to move the biased drum out of contact with the annular ring, the drum then assuming a position in which its zero marking lies directly above the axis of the drum, the angle of inclination of the surface, if any, being then read off roughly by comparing the position of the pointer 5 with the graduations on the drum. If it is not possible to read off the angle of inclination when the instrument is in position upon the surface, or if a more accurate reading is required than is indicated by the drum and pointer alone, the releasing nut is turned to allow the spring to force the biased drum into frictional locking engagement with the annular ring, in which case the instrument can be removed from the surface and the reading taken or observed in a more convenient position and with the assistance of the vernier if required.

In order to facilitate the taking of readings, the casing may be provided with a suitable magifying lens arranged above the sight window for the purpose of magnifying the graduations appearing on the drum and vernier, the lens and its associated mounting being angularly adjustable about the axis of the drum to bring the lens into a position in which it lies directly above that part of the vernier scale which it is wished to observe. By employing an annular ring and thus distributing the braking force concentrically around the drum's axis, there is no tendency for the drum to be tilted laterally and the bearings to be strained as might be possible if the braking force were applied other than concentrically about the axis of the drum. If desired the casing may contain a bath of fluid for the purpose of damping out oscillations of the drum although in practice this is not generally found to be necessary. The instrument may be used in any position between the horizontal and vertical positions and may, if desired, be used upside down, in which position a reading of 180° on the drum will indicate that the surface is horizontal, whilst if applied to a truly vertical surface the reading will be 90°. In addition to being used in the ordinary way for ascertaining the inclination, if any, of the surface or member upon which it may be placed, the instrument may also be fitted with or adapted for use in conjunction with optic sights to enable the instrument to be used for taking sight readings. Furthermore, the working parts of the instrument may be enclosed in a casing or housing of circular or other shape and may be adapted for attachment to any suitable measuring instrument in place of a spirit level, in which case of course the under surface of the casing or housing need not necessarily be flat.

What we claim and desire to secure by Letters Patent of the United States is:

1. A level or clinometer comprising a casing, a biased indicating drum revolubly mounted on bearings carried by a central spindle in said casing, said indicating drum graduated in degrees around its periphery, means for preventing rotation of said spindle, an annular ring of the same external diameter as the drum located in said casing coaxially with said drum and graduated over a part of its peripheral surface to form a vernier, a sight window in said casing through which a part of the peripheral surfaces of said drum and the whole of the vernier scale can be observed and a reading taken, means for moving said drum axially in one direction into frictional locking engagement with said annular ring into a position in which the graduations on the drum and vernier lie in juxtaposition, and means for moving said drum axially in the opposite direction out of frictional contact with said annular ring so as to allow said drum to turn freely about its axis.

2. A level or clinometer comprising a casing, a biased indicating drum revolubly mounted on bearings carried by a central spindle located in said casing, said indicating drum being graduated in degrees around its periphery, an annular ring of substantially the same external diameter as said drum adjustably located in said casing coaxially with the drum and graduated over a part of its peripheral surface to form a vernier scale, a sight window in said casing through which a part of said drum and the whole of the vernier scale can be observed and a reading taken, a spring firmly secured to said spindle and bearing against the inner wall of said casing to move said drum into frictional locking engagement with the whole of the respectively adjacent surface of said annular ring so as to avoid rotation of said spindle and possible accidental rotation of said drum, the graduations on the drum and vernier lying generally in juxtaposition, and an adjustable nut carried by said casing for cooperating with said spindle to move said spindle and drum against the action of said spring into a position in which said drum lies out of frictional contact with said annular ring so as to allow said drum to turn freely about its axis.

ARTHUR LEONARD MONGER.
WILLIAM ALEXANDER CUTHBERT.